United States Patent [19]

Sturges, Jr.

[11] 4,295,740
[45] Oct. 20, 1981

[54] PHOTOELECTRIC DOCKING DEVICE

[75] Inventor: Robert H. Sturges, Jr., Plum Borough, Pa.

[73] Assignee: Westinghouse Electric Corp., Pittsburgh, Pa.

[21] Appl. No.: 939,555

[22] Filed: Sep. 5, 1978

[51] Int. Cl.³ .................. G01B 11/26; B64G 1/62
[52] U.S. Cl. .................................. 356/152; 244/161; 250/203 CT; 356/4; 358/100; 358/107
[58] Field of Search ............. 356/4, 152, 141, 153, 356/154; 250/203 CT, 203 R, 557; 358/107, 100; 244/161, 171; 414/730

[56] References Cited

U.S. PATENT DOCUMENTS

| | | | |
|---|---|---|---|
| 3,224,709 | 12/1965 | Blizard | 244/161 |
| 3,320,420 | 5/1967 | Paglee et al. | 356/152 |
| 3,614,439 | 10/1971 | Beelik, Jr. et al. | 356/152 |
| 3,679,307 | 7/1972 | Zoot et al. | 356/4 |
| 3,739,089 | 6/1973 | Latall | 358/100 |
| 3,775,741 | 11/1973 | Zechnowitz et al. | 356/153 |
| 3,783,189 | 1/1974 | Nelson | 358/100 |
| 3,888,362 | 6/1975 | Fletcher et al. | 414/730 |
| 3,910,533 | 10/1975 | Cheatham | 244/161 |
| 3,943,360 | 3/1976 | Parkin | 356/152 |
| 3,954,340 | 5/1976 | Blomqvist et al. | 356/152 |

Primary Examiner—S. C. Buczinski
Attorney, Agent, or Firm—Daniel C. Abeles

[57] ABSTRACT

A photoelectric docking device for remotely positioning a first member relative to a second member, having a point light source coupled to the first member, which is directed to focus a narrow beam of light on a photosensor fixedly connected to the second member. The photosensor is responsive to the reception of light from the point light source on the first member to provide electrical outputs representative of the relative position of the point source with respect to the photosensor in three-dimensional space. The electrical outputs of the photosensor are then displaced as a three-dimensional pictorial representation of the relative position of the first and second members. Means are further provided for identifying when the first and second members are in intimate contact.

13 Claims, 13 Drawing Figures

PHOTOELECTRIC DOCKING DEVICE

BACKGROUND OF THE INVENTION

This invention pertains generally to three-dimensional position indication systems and more particularly to photoelectric docking systems for remote manipulators.

Remote manipulators are frequently employed to handle a variety of end-effectors or tools. In acquiring these tools, the wrist or hand of the manipulator is brought up to the tool and carefully positioned so that a set of jaws or a clamp can complete the attachment of the tool to the arm. Similarly, when a tool is released it is often required that the arm withdraw along a precise path to prevent bumping the tool on other nearby objects. The degree of precision with which this acquisition or "docking" is accomplished is directly related to the relative stiffness of the manipulator arm and the tool acquired. That is, a set of jaws can dock with a tool with a certain amount of clearance before the jaws close. The error in position (less than the clearance) must be taken up by the deflection of the arm or the object grasped; when the jaws close, the error at the jaw/hand interface is zero. If it was not zero, one could not tell for certain the spatial relation between the jaw and the object.

In accomplishing the acquisition maneuver, the manipulator operator requires high resolution feedback to observe the jaw/tool interface; especially when high precision is required by stiff arms and rigid tool holders. Lighting conditions and the location of television cameras do not always allow adequate viewing of the operation. Furthermore, a depth preception capability can rarely be provided even where the relative positioning of tools in three dimensional space is extremely important such as in the sophisticated application described in patent application Ser. No. 806,232, filed June 13, 1977, entitled "Remote Access Manipulator".

Accordingly, a new high resolution visual feedback system is desired to assist a manipulator operator to accurately perform remote docking and undocking maneuvers.

SUMMARY OF THE INVENTION

Briefly, this invention overcomes the deficiencies of the prior art by providing a photoelectric docking device with the desired relative positioning and depth perception capabilities desired for remotely positioning a first member relative to a second. In accordance with this invention a point light source is connected to the first member and directed to focus a narrow beam of light along a pre-established path to a photosensor rigidly mounted on the second member. The photosensor is responsive to the reception of light to provide electrical outputs representative of the relative position of the two members in three-dimensional space. The photosensor outputs are then displayed as a three-dimensional pictorial representation of the position of the first member with respect to the second.

In the preferred embodiment means are provided for identifying when the first and second members approach intimate contact.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
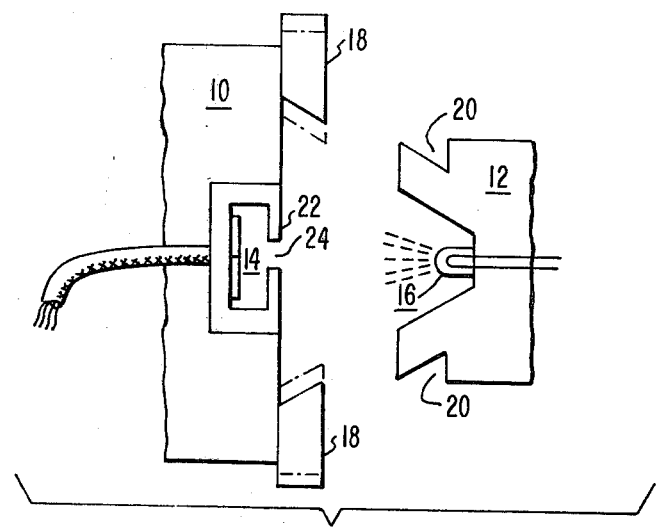
FIG. 1 is a side schematic view of the docking elements of this invention.

A schematic arrangement of the photoelectric positioning system of this invention is illustrated in FIG. 1. The arrangement is generally useful for positioning one object with respect to another and is more particularly suited for docking a manipulator arm 10 with an end-effector or tool 12. The manipulator arm 10 is illustrated affixed with a photosensor 14 and the end-effector 12 is shown carrying a point light source 16, however, it should be appreciated that the manipulator could alternatively carry the light source and the photosensor array could be coupled to the end-effector.

The object of the docking exercise is to secure the end-effector within the movable jaws 18 of the manipulator arm by closing the jaws against the slots 20. In this manner the manipulator can retrieve a tool and perform assigned tasks under the direction of a remote operator. The manner in which this exercise is achieved can be appreciated from the following description.

Figure 2:
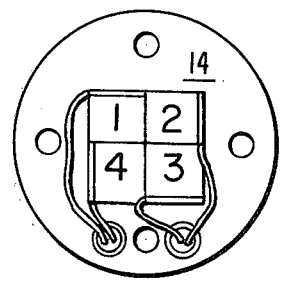
FIG. 2 is a plan view of the photosensor array illustrated in FIG. 1.
Figure 12:
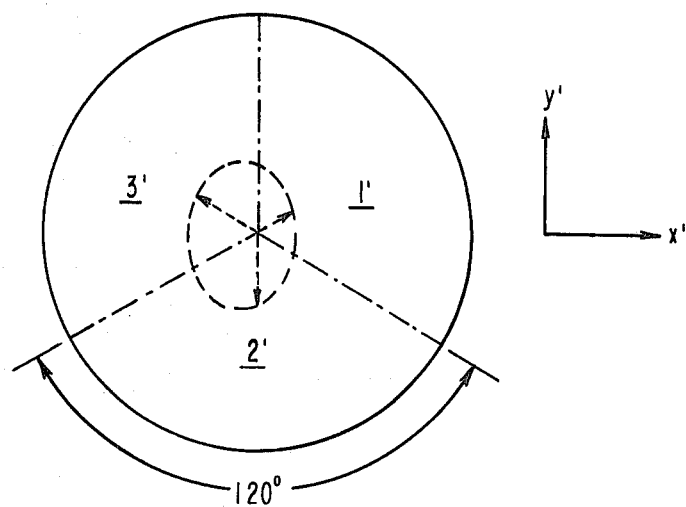
FIG. 12 is a plan view of a second embodiment of the photosensor of this invention, which can be employed with the apparatus of FIG. 1.

The exemplary light sensor 14 illustrated in FIG. 2 includes an array of photosensor zones, which can either be formed from an arrangement of separate cells or from a continuous array figuratively divided into sections as shown in FIG. 12. At least three sections or zones are required to establish a three-dimensional pictorial display. The photosensor illustrated in FIG. 2 is divided into quadrants or four zones for the purpose of illustration.

The photosensor outputs are taken from the center location on each quadrant. Where three zones are employed the sections would be similarly, symmetrically divided with the outputs taken from the center of each zone. The photocell array is desirably enclosed within the black enclosure 22, shown in FIG. 1, shielded from ambient light except for a small aperture 24 centered over the array.

The point source 16 shining on the enclosure will project a spot of light on the array; the position of the spot of light being dependent upon the position of the point source 16 relative to the aperture 24. The distance from the light source to the photosensor array can be established from the intensity of light impinging on the photosensor.

Figure 3:
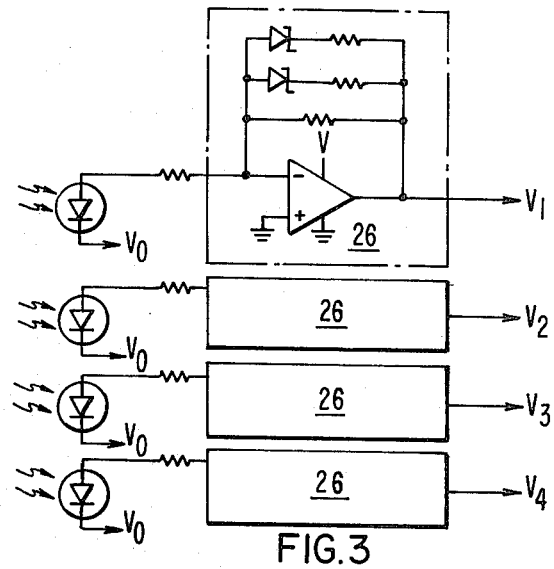
FIGS. 3, 4, 5, 6 and 7 are circuitry schematic diagrams which can be employed in accordance with this invention to process the electrical outputs of the photosensor of FIG. 2 to provide a three-dimensional pictorial display.

The photosensor outputs are desirably processed through a log amplifier arrangement, such as the one illustrated in FIG. 3, within close proximity of the sensor assembly, so that the output signals can be transported to a remote display without degradation of the signals. The display circuit receives the log of the intensity of light from the amplifiers, which compresses the light signals into a nearly linear scale of proportionate distances, such as would be perceived by the eye in place of the sensor.

Figure 4:
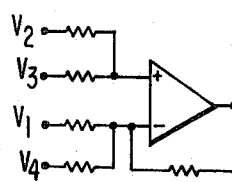
Figure 5:
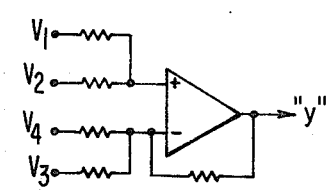
Figure 6:
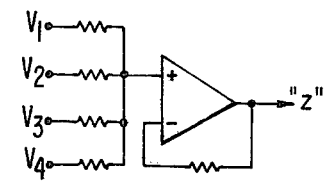

As illustrated in FIGS. 4, 5 and 6 the four output signals from the respective zones of the photosensor of FIG. 2 are added together to display the distance "z" between the photosensor and the light source; the output signals from the lower zones of the photosensor are subtracted from the sum of the outputs from the upper zones to yield the "up/down" vector sum or "y"-signal; and the sum of the output signals from the left-hand pair of photosensor zones are subtracted from the sum of the output signals from the right photosensor zones to yield the "right/left" vector sum or "x"-signal. As will be appreciated by those skilled in the art, approximately the same result can be achieved by utilizing the vector sum of the outputs of a continuous photosensor figuratively divided into three cells as illustrated in FIG. 12. In such case:

$$X' = \cos 30° \, (V_1' - V_3') = 0.866(V_1' - V_3')$$

$$Y' = 0.5V_1' - V_2' + 0.5V_3'$$

$$Z' = V_1' + V_2' + V_3'$$

Figure 13:
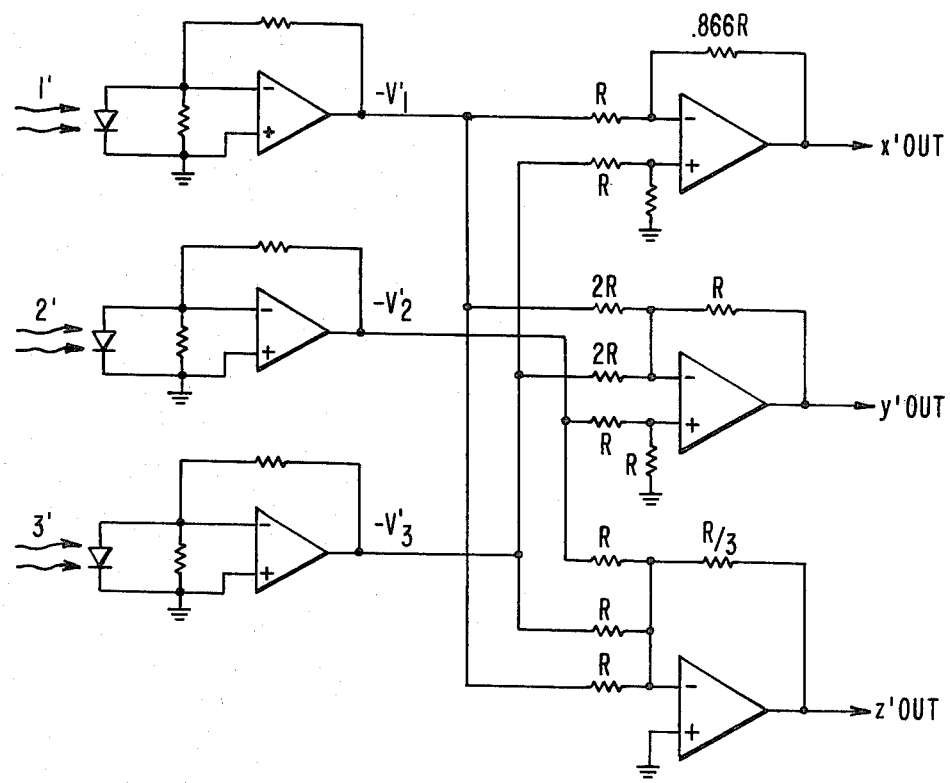
FIG. 13 is a schematic circuitry diagram which can be employed in accordance with this invention to process the electrical outputs of the photosensor of FIG. 12 to provide a three-dimensional pictorial display.

The circuit of FIG. 13 is an ordinary engineering extension of employing the vector sum, applied to the continuous photosensor surface of FIG. 12 to establish the corresponding $X'$, $Y'$ and $Z'$ outputs.

Figure 7:
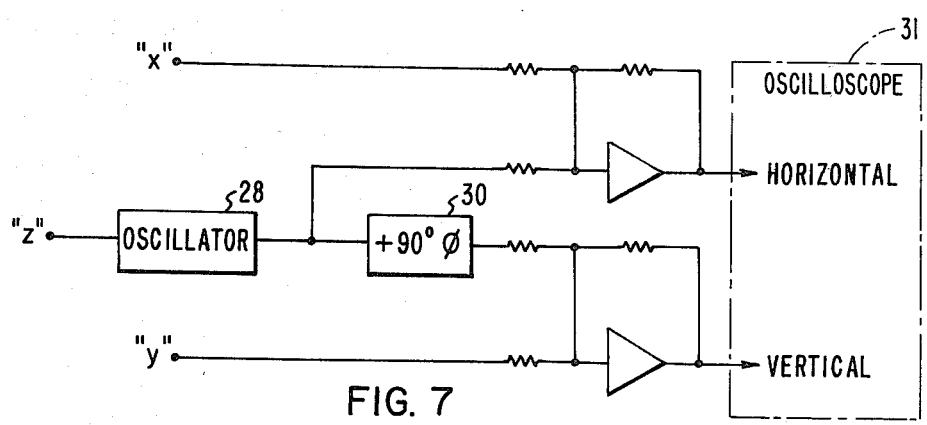

The "z"-signal outputted from the circuit of FIG. 6 is then inputted to a sine wave oscillator 28 shown in FIG. 7, which provides a corresponding output with an amplitude proportional to the "z" modulating value. The modulated wave is added to the "x"-signal identified in FIG. 4 and the sum is communicated to the horizontal input of an oscilloscope display 31. The output of the oscillator 28 is also delayed 90 degrees to form a cosine function which is added to the "y"-signal output identified in FIG. 5 to establish the vertical input to the oscilloscope 31. The same results could be achieved with the corresponding inputs $X'$, $Y'$ and $Z'$. The resulting display produced by the oscilloscope 31 consists of a circle having diameter which is inversely proportional to the distance between the light source and the photosensor, whose position on the display screen is proportional to the relative lateral displacement of the photosensor with respect to the light source.

A similar result could be achieved if a triangle wave generator was employed in place of the sinusoidal oscillator 28 shown in FIG. 7. In this case the display generated would consist of a diamond instead of a circle, however the relative size and position of the diamond would vary in the same manner as previously described. Similarly, other geometric patterns could be chosen for the display by employing the appropriate choice of carrier wave.

Thus, the manipulator operator need only position the jaws to the tool approximately by the usual means of feedback (i.e. TV, or master-slave control), or until the light source is close enough to the photosensor to generate a suitable output. Then, the operator observes the position and size of the display as he brings the jaws toward the object. When the image is centered on the screen and of the appropriate size determined by previous calibration, the operator can safely actuate the jaw to close. Retreat of the jaws from the tool is similarly done; keeping the image in the center as it grows steadily smaller and out of range.

In practice, the displayed scene can represent a magnified view of the docking operation, so high accuracies, hence low stresses, can be achieved.

Figure 8:
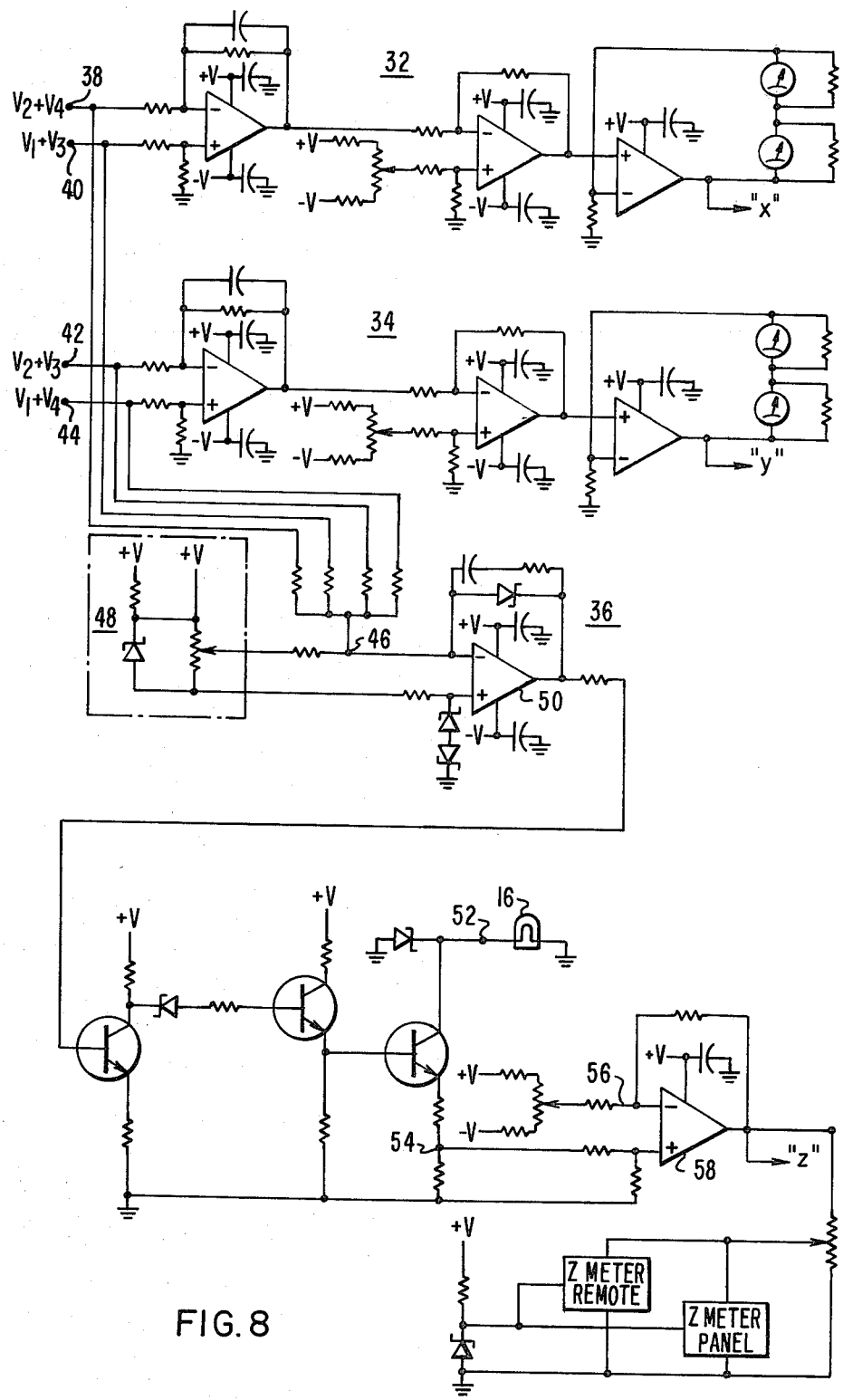
FIG. 8 is a detailed circuitry schematic of the preferred method of processing the outputs of the light sensor of FIG. 2 to provide a pictorial display.

FIG. 8 represents a preferred modification to the circuitry illustrated in FIGS. 4, 5, 6 and 7. Like reference characters are employed in the various figures to represent corresponding components and values. Voltages $V_1$, $V_2$, $V_3$ and $V_4$, noted in FIG. 3, correspond to the voltage outputs from the four photosensor zones. The sum of voltages $V_2$ and $V_4$ is coupled to terminal 38 and the sum of voltages $V_1$ and $V_3$ is coupled to terminal 40. The two sums are subtracted by the circuitry 32 to provide the "x" output. Similarly, the sum of voltages $V_2 + V_3$ is coupled to terminal 42 and the sum of voltages $V_1$ and $V_4$ is coupled to terminal 44. The latter two sums are subtracted by the circuitry 34 to provide the "y" output.

The four photosensor outputs $V_1$, $V_2$, $V_3$ and $V_4$ are summed at terminal 46 in the circuitry 36 to provide an output proportional to the distance between the light source and the photosensor. Circuit segment 36 employs the sum at terminal 46 to vary the intensity of the light source with its distance from the photosensor to prevent the photosensor from becoming saturated when in close proximity to the light source 16. The light intensity control is established by comparing the sum of the voltages appearing at terminal 46 with a reference voltage 48 using differential amplifier 50. The output is then processed through several stages of amplification and coupled through terminal 52 to drive the lamp 16. Thus, reference voltage 48 forms the maximum energizing force for illuminating the lamp 16. As the lamp approaches the photosensor the sum of voltages $V_1$, $V_2$, $V_3$ and $V_4$ increases, diminishing the lamp's energizing force.

It has been found that the $1/R^2$ law for brightness is approximately equal to the resistance characteristic of an incandescent lamp, resulting in a near-linear output at terminal 54 which is proportional to the "z" dimension; the distance between the light and photosensor. The "z" output is calibrated by the addition of an appropriate offset inputted at terminal 56 to amplifier 58 to establish a compatible display output.

Figure 10:
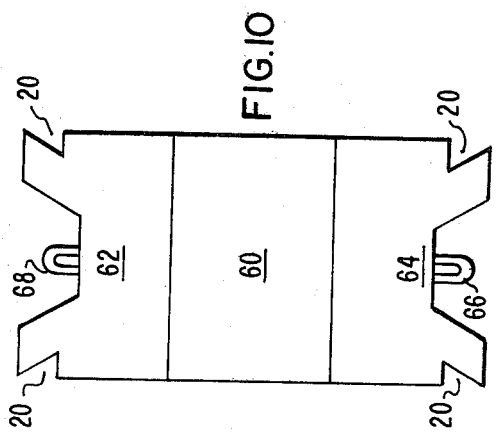
FIG. 10 is a schematic view of a manipulator end-effector arrangement which can apply the modified light assembly illustrated in FIG. 9.
Figure 9:
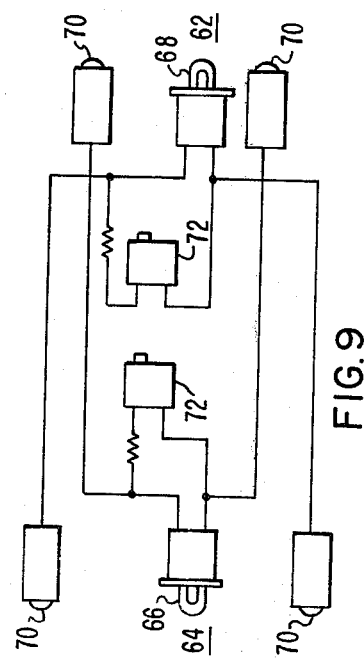
FIG. 9 is a planned view of a modified light source arrangement.
Figure 11:
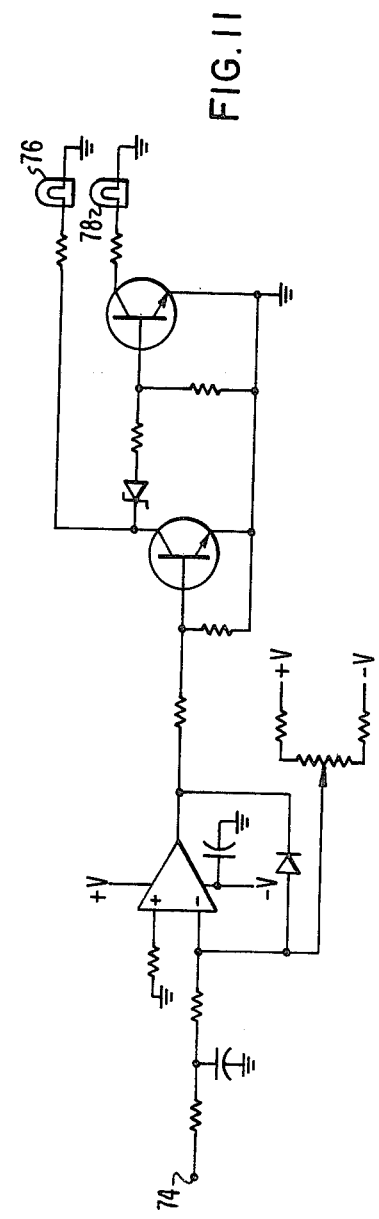
FIG. 11 is a schematic diagram of the read-out circuitry for the contact indicator of the modified light source arrangement of FIG. 9.

In a number of applications, such as the one identified in pending application Ser. No. 806,232, filed June 12, 1977 it is desirable to have a remote manipulator deliver an end effector to a second fixture and later retrieve the end effector. A view of an end-effector suitable for this purpose is illustrated in FIG. 10. The end-effector 60 is similar to the end effector 12 previously shown in FIG. 1, with corresponding slots 20 on either side 62 and 64. Slotted side 64 can be used to interface with the manipulator arm while side 62 is employed to interface with the second fixture. Each side includes a corresponding light source 66 and 68, each of which functions the same as the light source 16. Each light source is driven from a corresponding terminal 52 identified in FIG. 8. As shown in FIG. 9 each light source arrangement also includes contact switches 70 connected in series between the energizing terminal 52 and the illuminating fixture. It should be noted that contact switches 70 positioned on side 64 activate the illuminating fixture 68 on side 62, while contact switches 70 on side 62 activate the illuminating fixture on side 64. The contact switches 70 are positioned to engage when the end-effector is in contact with the member it is intended to dock with. For example, light source 68 will not be energized unless side 64 of the end-effector is in contact with the manipulator arm. Thus, energization of the light source 68 will provide an indication that the manipulator has made contact directly with the end-effector. Energization of each light source can be displayed at a remote location by the circuitry illustrated in FIG. 11 to identify contact. Each light source is connected in series with the corresponding terminal 75 shown in FIG. 11. The circuit illustrated will provide an indication at output 78 when the end-effector is docked, or alternately the output at terminal 76 will indicate that the end-effector is not docked.

Accordingly, the apparatus of this invention provides a means of synthesizing a display of position information in three axes that correspond to a natural, direct view of the docking mechanisms to enable precise remote positioning with accurate control.

I claim:

1. A photoelectric docking device for remotely positioning in three dimensional space a first member relative to a second member comprising:
   a point light source fixedly connected to the first member and directed to focus a narrow beam of light along a pre-established path;
   a photosensor fixedly connected to the second member, which is responsive to the reception of light from the point light source on the first member to provide electrical outputs representative of the relative position of the point source with respect to the photosensor in three dimensional space, the photosensor having at least three electrical outputs taken from substantially symmetric locations over the photosensitive area of the cell;
   means for processing the photosensor outputs into a second set of electrical outputs representative of the cartesion coordinates of the first member with respect to the second;
   means for displaying the electrical outputs as a pictorial representation of the relative position of the first and second members in three dimensional space;
   means for detecting physical contact between the first and second members and providing an electrical signal representative thereof; and
   means responsive to the signal to provide a remote indication of such contact.

2. The photoelectric device of claim 1 wherein the identifying means deenergizes the point light source upon such contact.

3. The photoelectric docking device of claim 1 wherein said photosensor comprises a continuous photocell having no external voltage bias.

4. The photoelectric docking device of claim 3 wherein said point light source consists of a single light emitting source.

5. A photoelectric docking device for remotely positioning in three dimensional space a first member relative to a second member with a remote manipulator and later retrieving the first member comprising:
   a first point light source fixedly connected to the first member and directed to focus a narrow beam of light along a pre-established path;
   a first photosensor fixedly connected to the second member, which is responsive to the reception of light from the first point light source on the first member to provide electrical outputs representative of the relative position of the first point light source with respect to the first photosensor in three dimensional space;
   a second light source fixedly connected to the first member and directed to focus a narrow beam of light along a preselected path;
   a second photosensor fixedly connected to the remote manipulator, which is responsive to the reception of light from the second light source on the first member to provide electrical outputs representative of the relative position of the second light source with respect to the second photosensor in three dimensional space; and
   means for displaying the electrical outputs of the first and second photosensors as a pictorial representation of the relative position of the first and second members and the manipulator in three dimensional space.

6. The photoelectric device of claim 5 including means for identifying when the first member respectively contacts the remote manipulator and the second member at corresponding pre-established locations.

7. The photoelectric device of claim 6 wherein the identifying means energizes the light source corresponding to the photosensor fixed to the second member when the first member contacts the remote manipulator at a first of the pre-established locations.

8. The photoelectric device of claim 4 wherein the identifying means deenergizes the light source corresponding to the photosensor fixed to the second member when the first member disengages contact with the remote manipulator at the first pre-established location.

9. The photoelectric device of claims 6 or 7 wherein the identifying means energizes the second light source when the first member contacts the second member at a second of the pre-established locations.

10. The photoelectric device of claim 9 wherein the identifying means deenergizes the second light source when the first member disengages contact with the second member at the second pre-established location.

11. A photoelectric docking device for remotely positioning in three dimensional space a first member relative to a second member comprising:
    a point light source fixedly connected to the first member and directed to focus a narrow beam of light along a pre-established path;
    a photosensor fixedly connected to the second member, which is responsive to the reception of light from the point light source on the first member to provide electrical outputs representative of the relative position of the point source with respect to the photosensor in three dimensional space, the photosensor having at least three electrical outputs taken from substantially symmetric locations over the photosensitive area of the cell;

means for processing the photosensor outputs into a second set of electrical outputs representative of the cartesion coordinates of the first member with respect to the second, wherein the difference between the combined photosensor outputs and the magnitude of the light energizing source is employed to establish the Z coordinate of the relative position of the first member with respect to the second member;

means for displaying the electrical outputs as a pictorial representation of the relative position of the first and second members in three dimensional space.

12. The photoelectric docking device of claim 11 wherein said photosensor comprises a continuous photocell having no external voltage bias.

13. The photoelectric docking device of claim 12 wherein said point light source consists of a single light emitting source.

* * * * *